April 20, 1937.  C. V. JOHNSON  2,077,933
SHOCK ABSORBER STRUT
Filed March 7, 1931

INVENTOR.
CARL V JOHNSON
BY
ATTORNEY.

Patented Apr. 20, 1937

2,077,933

UNITED STATES PATENT OFFICE 2,077,933

SHOCK ABSORBER STRUT

Carl V. Johnson, South Bend, Ind., assignor to Bendix Research Corporation, South Bend, Ind., a corporation of Indiana Application March 7, 1931, Serial No. 520,773

18 Claims. (Cl. 267—64)

This invention relates to shock absorbers and more particularly to shock struts.

To absorb the shock which would otherwise be imposed upon the structure of an airplane in taxiing over rough and uneven ground and when landing after a flight it has been found desirable to incorporate some form of shock strut between the landing wheels and the fuselage.

Many different forms of shock struts have been devised for this purpose—among which are to be found both pneumatic and hydraulic, and a few combined pneumatic and hydraulic. The present invention relates to the latter type and aims to greatly improve and simplify the structure of this particular type.

Broadly the invention comprehends a shock strut comprising telescopic chambers which under impact of landing cause a flow of hydraulic liquid to develop the desired resistance by being forced from one chamber through an orifice past a metering pin of definite contour into the other chamber where gas is contained under pressure and to further compress the gas by the rise of the liquid, the resistance offered by the flow of the liquid and resultant compression of the gas being combined to give the ideal work curve.

In the illustrated embodiment of the invention, on the compression stroke the liquid passes freely through a flap valve on the upper end of an inner chamber into which the metering pin extends, and on the return stroke the valve closes due to pressure of the compressed gas forcing the liquid to return through small openings or passages near the lower end of the inner chamber, preventing sudden rebound that would otherwise result.

An object of the invention is to provide a combined pneumatic and hydraulic shock strut in which the resistance offered by the compression of the air or gas and the flow of a suitable hydraulic fluid are combined to give a satisfactory work curve.

Another object of the invention is to provide a combined pneumatic and hydraulic shock strut comprising telescopic chambers filled with a suitable hydraulic fluid and air or gas under pressure, which under impact of landing causes the hydraulic liquid to develop the desired resistance by being forced from one chamber to the other through an orifice past a metering pin of definite contour into the chamber where the air or gas is further compressed by the rise of the liquid.

The above and other objects and features of the invention including various details of structure will be apparent from the following description of the illustrated embodiment shown in the accompanying drawing, in which.

Figure 1:
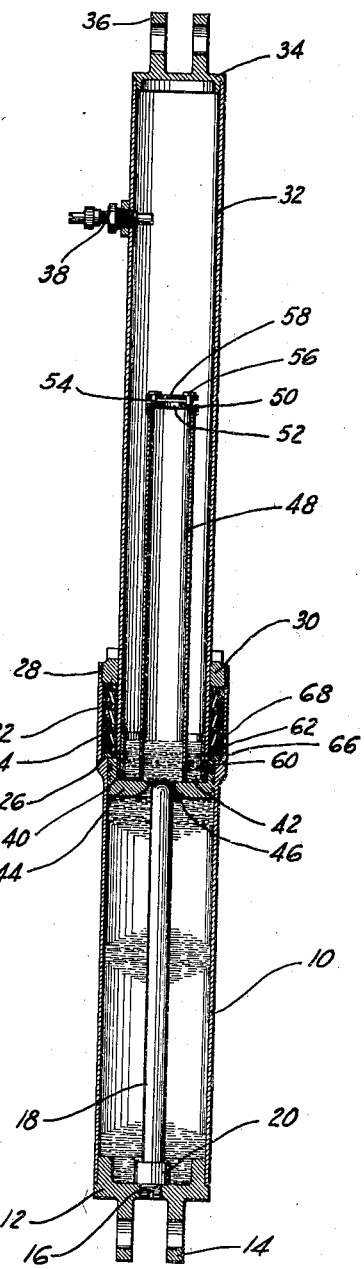
Figure 1 is a longitudinal sectional view of the strut in the completely extended position.
Figure 2:
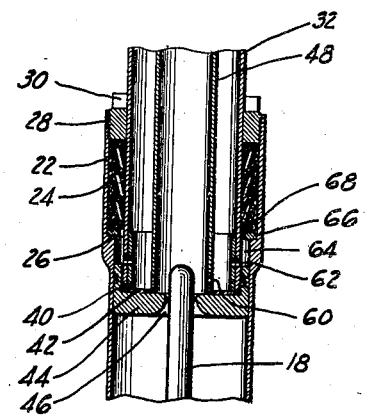
Figure 2 is an enlarged fragmental view illustrating the strut partially collapsed.

Referring to the drawing for more specific details of the invention, 10 represents a cylindrical chamber closed at one end as by a plug 12 having formed integrally therewith a clevis 14 for attaching to the axle of an airplane.

The plug has a central bore 16 for the reception of a metering pin 18 of a definite contour. As shown, the metering pin 18 is threaded in the bore 16 and is provided with a circumferential flange 20 engaging the plug to lend strength and rigidity to the structure.

The other end of the cylindrical chamber has a portion 22 of increased diameter providing a suitable packing chamber 24. A shoulder 26 is formed in one end of the chamber 24, and the other end of this chamber is internally threaded as indicated at 28 for the reception of a packing ring 30.

Positioned for reciprocation in the cylindrical chamber 10 is a cylindrical chamber 32 closed at one end as by a plug 34 having formed integrally therewith a clevis 36 for attachment to the fuselage of the plane. This chamber has suitably positioned in its wall a filler valve 38, the object of which will hereinafter appear.

The other end of the chamber 32 has inserted therein a reinforcing band 40 which may be spot-welded or otherwise secured in position. The reinforcing band 40 is spaced from the end of the chamber 32 to provide a suitable shoulder for a centering ring 42 clamped in position by a piston 44 threaded on the cylindrical section 32 provided with a metering orifice 46 adapted to receive the metering pin 18.

Suitably secured at one end to the centering ring 42 is a cylindrical inner chamber 48 positioned in the chamber 32 concentrically therewith and with respect to the metering pin 18. The other end of the chamber 48 has thereon a cap 50 provided with an orifice 52 and a concentric flange 54. Arranged in spaced relation on the cap in a circle, the center of which coincides with the center of the orifice 52, is a plurality of pins 56 supporting a flap valve 58 adapted to seat on the flange 54 to close the orifice 52.

The section 48 has a plurality of orifices 60 providing suitable communications between the cylindrical chamber 48 and the cylindrical chamber 32, and the chamber 32 has orifices 62 providing suitable communications between the annular chamber 64 formed back of the piston head between the outer surface of the chamber 32 and the inner surface of the chamber 10 on the compression stroke.

The cylindrical chambers 10 and 32 are held together by a flat ring 66 seated on the shoulder 26 and secured in position by suitable packing lips 68 confined between the ring 66 and the packing ring 30. The ring 66 has sufficient clearance to provide a suitable communication between the chamber 64 and the packing chamber 24, so that the packing lips 68 may be kept under pressure.

In operation, the strut which is shown in completely extended position is filled with a suitable hydraulic liquid and air or gas under pressure.

Assuming that the strut is filled with a suitable hydraulic fluid and air or gas, the strut will under impact of landing cause the hydraulic liquid to be forced through the orifice in the head of the piston, past the metering pin into the upper chamber where the air or gas will be compressed by the rise of the liquid, and this combined resistance offered by the compression of the air or gas and the flow of the liquid produces the work curve desired.

On the compression stroke the liquid passes freely through the flap valve on top of the inner chamber into which the metering pin extends, and on the return stroke the flap valve closes due to the pressure of the compressed air or gas forcing the liquid to return through the small passages near the bottom of the inner chamber, thus preventing the sudden rebound that would otherwise result. It will be observed that the annular chamber between the outside of the upper chamber and the inside of the lower chamber, which is formed on the compression stroke, is freely vented to the annular chamber to maintain a direct pressure on the packing lips at all times.

Figure 3:
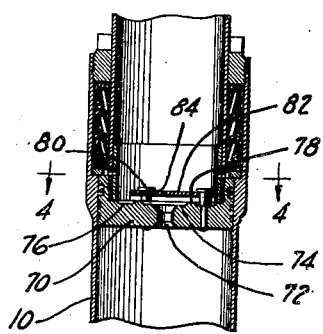
Figure 3 is a fragmentary sectional view illustrating a modification.
Figure 4:
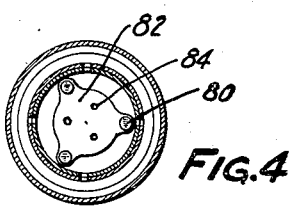
Figure 4 is a sectional view substantially on line 4—4 of Figure 3.

It has been found that due to the character of a pneumatic compression curve it may be advantageous to use a fixed orifice and eliminate the metering pin together with the associated inner chamber. A modification illustrating this structure is shown in Figures 3 and 4 wherein the piston 70 is provided with a circular orifice 72 communicating with a depression or recess 74 formed in the back of the piston together with an annular groove or depression 76 concentric thereto which provide between them an annular portion 78.

Suitably secured to the piston is a series of pins 80 arranged in spaced relation to support a flap valve 82 adapted to seat on the annular portion 78 and close the metering orifice. As shown, the flap valve 82 has a plurality of spaced openings 84 providing communications between the chamber 32 and the recess 74 when the valve is in the closed position. The functioning of this modified form of the invention is substantially the same as that of the preferred form, and hence further description thereof is deemed unnecessary.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A shock absorbing strut comprising a piston having a metering orifice, a metering pin cooperating with the orifice, a chamber secured to the piston communicating with the orifice and adaptable for the reception of the metering pin and a valve for closing the chamber.

2. A shock absorbing strut comprising a chamber, a piston secured to the chamber, a centering ring secured to the piston, an inner chamber secured to the centering ring and a valve controlling the inner chamber.

3. A shock absorbing strut comprising a chamber, a reinforcing band secured in one end of the chamber, a centering ring supported by the band, an inner chamber supported by the ring and a valve controlling the inner chamber.

4. A shock absorbing strut comprising a chamber, a reinforcing band secured therein in spaced relation from one end thereof, a centering ring supported by the reinforcing band, a piston threaded on the chamber securing the centering ring against the band, an inner chamber supported by the centering ring and a valve controlling the inner chamber.

5. A shock absorbing strut comprising a cylindrical chamber, a cap closing one end of the chamber, a reinforcing band secured in the chamber in spaced relation from the other end thereof, a centering ring supported by the reinforcing band, a piston threaded on the cylinder clamping the centering ring against the reinforcing band, an inner chamber supported at one end by the centering ring and a valve in the other end of the inner cylinder.

6. A shock absorbing strut comprising telescopic chambers, a piston carried by one of the chambers having a metering orifice, a check valve for said orifice, a metering pin carried by the other chamber cooperating with the metering orifice, and means securing the chambers together including a packing chamber, packing glands in the chamber and means retaining the packing glands under fluid pressure, said strut containing liquid and gas under sufficient pressure to support the normal load imposed upon the strut.

7. A shock absorbing strut comprising telescopic chambers, an apertured piston carried by one of the chambers fitting snugly in the other chamber, a metering pin carried by the outer chamber cooperating with the aperture in the piston, means for checking the flow of liquid through the piston aperture in one direction, and means retaining the chambers together including a packing chamber, packing glands in the packing chamber and means imposing fluid pressure on the packing glands, said strut containing liquid and gas under sufficient pressure to support the normal load imposed upon the strut.

8. A shock absorbing strut comprising telescopic chambers, an orificed piston secured to one of the chambers fitting snugly in the other chamber, a metering pin supported in one of the chambers cooperating with the orifice, an inner chamber communicating with the orifice and adapted to receive the metering pin, a valve in one end of the inner chamber and a metering vent in the other.

9. A shock absorbing strut comprising telescopic cylindrical chambers, an orificed piston carried by one of the chambers, a metering pin carried by the other chamber cooperating with with the orifice, an inner cylindrical chamber arranged concentrically with the chamber carrying the piston and communicating with the orifice in the piston and adaptable for the reception of the metering pin, a valve on the inner chamber controlling the orifice in the piston and a vent from the inner chamber to the chamber carrying the piston.

10. A shock absorbing strut comprising telescopic cylindrical chambers closed at their outer ends and filled with hydraulic fluid and gas under pressure, an orificed piston on the chamber containing the gas fitting snugly in the chamber containing the hydraulic fluid, a metering pin supported in the chamber containing the hydraulic fluid cooperating with the orifice in the piston, an inner cylindrical chamber arranged concentrically within the chamber containing the gas adaptable for the reception of the metering pin, a flap valve for closing the inner chamber, means for venting the inner chamber to the chamber carrying the piston, means securing the cylinders together and means for retaining the securing means under pressure.

11. A shock absorbing strut comprising telescopic cylindrical chambers, an orificed piston carried by one of the chambers, an inner chamber supported on the piston communicating with the orifice, the piston being movable against fluid contained in the other chamber to cause displacement of the fluid through the orifice into the inner chamber and the chamber carrying the piston against gas contained therein under pressure and means for securing the telescopic chambers together including a packing chamber communicating with one of the telescopic chambers.

12. A shock absorbing strut comprising telescopic cylindrical chambers closed at their outer ends, on orificed piston carried by one of the chambers fitting snugly in the other chamber, an inner chamber arranged concentrically within the chamber carrying the piston and communicating with the orifice therein, the piston being movable against hydraulic fluid contained in one of the chambers to cause the fluid to meter through the orifice in the piston into the inner chamber and the chamber supporting the piston against compressed gas contained therein, and means for securing telescopic chambers together including a packing chamber communicating with one of the telescopic chambers.

13. In a shock absorbing strut, a piston, an orifice therein, a metering pin movable axially with respect to said piston and cooperating with said orifice, a chamber of substantially the length of said metering pin secured at one end to said piston and surrounding said aperture, a check valve closing the other end of said chamber permitting fluids to flow out of said chamber and a fixed leak orifice in the wall of said chamber.

14. In a shock absorbing strut, a piston, an orifice therein, a metering pin movable axially with respect to said piston and cooperating with said orifice, a housing secured at one end to said piston, and surrounding said orifice having an axial length substantially equal to said metering pin, a flow actuated check valve in the opposite end permitting egress of fluid in the housing, and a fixed orifice in said housing for controlling ingress of fluid thereinto.

15. In a shock absorbing strut, a piston, a single orifice therein, a metering pin movable axially with respect to said piston and cooperating with said orifice, a housing secured at one end to said piston, and surrounding said orifice having an axial length substantially equal to said metering pin, a flow actuated check valve in the opposite end permitting egress of fluid in the housing, and a fixed orifice in said housing for controlling ingress of fluid thereinto.

16. In a shock absorber, a metering pin housing member, having a check valve in one end and a fixed leak orifice adjacent the other.

17. In a shock absorber, a metering pin housing member substantially vertically arranged, a check valve in the upper end thereof and a fixed leak orifice adjacent the lower end.

18. A shock absorber strut comprising telescopic sections containing fluid and gas under pressure and provided with a chamber, a packing in said chamber adapted to prevent the loss of fluid as the sections move relative to each other in telescoping, a washer having a loose fit in said chamber for maintaining said packing in position, and fluid flow means connecting said chamber with one of said sections, said connecting means being of sufficient size to permit unrestricted flow of fluid into and out of said chamber and around said washer whereby said packing is maintained under a fluid pressure substantially equal to that of the gas pressure.

CARL V. JOHNSON.